Oct. 7, 1958     H. G. BOLMES ET AL     2,855,222
SELF LOCKING TRAILER COUPLING
Filed July 16, 1956
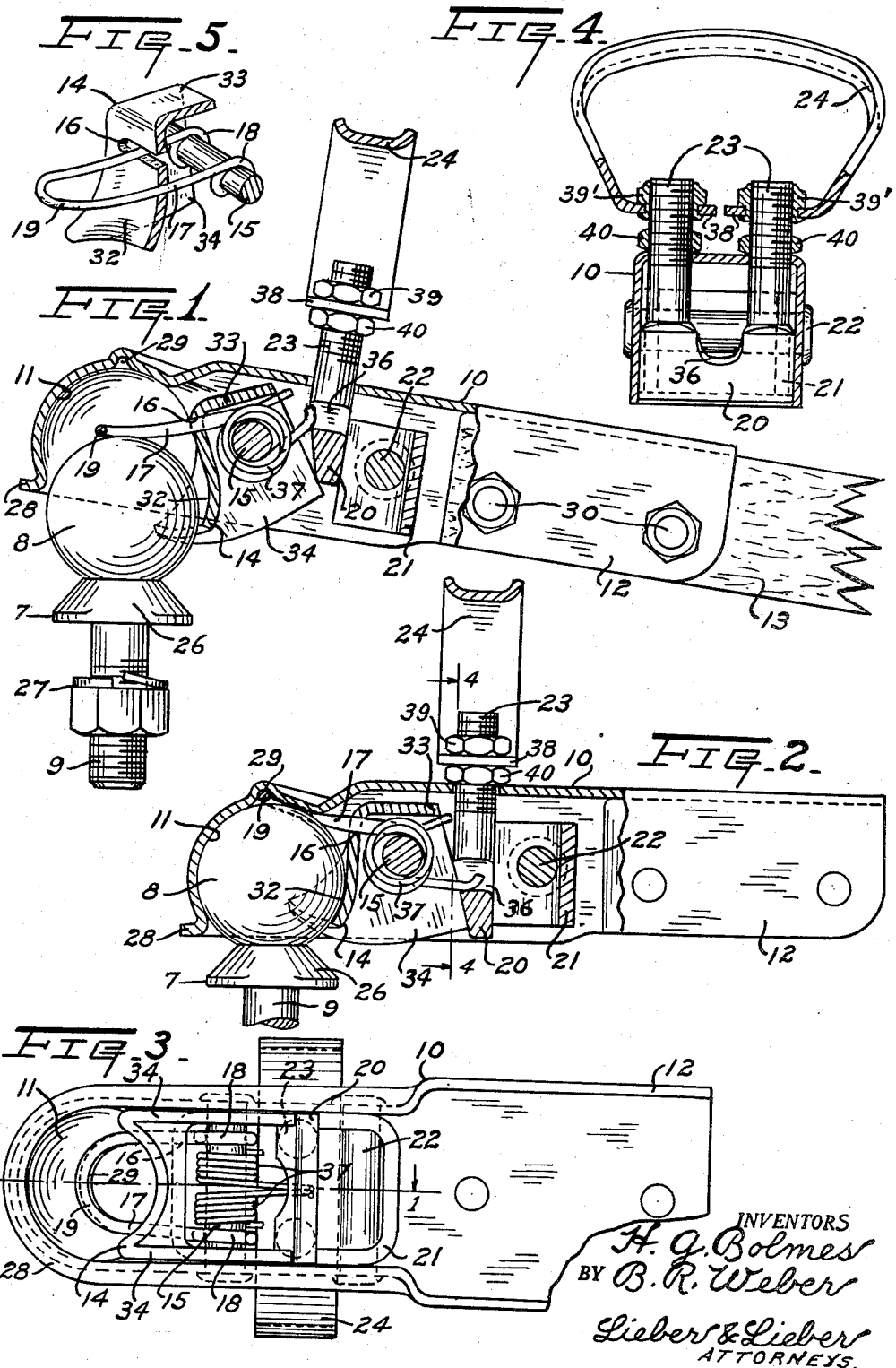

United States Patent Office 2,855,222
Patented Oct. 7, 1958

2,855,222

SELF LOCKING TRAILER COUPLING

Henry G. Bolmes, West Allis, and Bernard R. Weber, Wauwatosa, Wis., assignors to The Fulton Company, West Allis, Wis., a corporation of Wisconsin Application July 16, 1956, Serial No. 598,154

6 Claims. (Cl. 280—512)

The present invention relates in general to improvements in couplings for connecting one mobile unit to another, and relates more specifically to improvements in the construction and operation of so-called trailer couplings for interconnecting several vehicles.

The primary object of this invention is to provide an improved self locking coupling especially adapted to interconnect two vehicles so that one may be drawn by the other.

Many different types of so-called trailer couplings for detachably connecting a trailer to a draft vehicle such as an automobile, have heretofore been proposed and extensively used; and perhaps the most commonly used trailer couplings are of the type embodying a ball member attachable to the rear bumper of the draft vehicle and having a sphere cooperable with a spherical recess in a socket member which is attachable to the tongue of the trailing vehicle to provide a universal connection between the vehicles. In order to permit the trailer to be readily detached from the hauling vehicle, it is ordinary practice to provide a latch on the socket member which is manually movable to engage the ball member and to thereby lock the members together when the coupling is in use, but which is likewise releasable whenever disconnection of the trailer is desired.

While these prior ball and socket couplings are quite satisfactory in actual use when the ball locking latch has been properly manipulated, it frequently happens that the users when applying the socket member to the ball member, forget to place the ball latch into final locking position. When this occurs, the latch may merely loosely coact with the sphere of the ball member so as to prevent actual separation of the coupling members while the trailer is advancing over relatively smooth pavement, but any extreme looseness between the coacting spherical surfaces will cause them to wear excessively and unevenly; and when traveling over rough terrain such looseness may even cause the ball to leave the socket and to therby disconnect the coupling members with resultant serious accidents.

It is therefore an important object of the present invention to provide an improved ball and socket type coupling wherein the two coupling members are automatically positively locked against possible separation whenever they are interconnected and without necessitating any special precautions on the part of the user.

Another important object of this invention is to provide a simple, compact and durable universal trailer coupling in which the coupling members may be conveniently disconnected when not in use, but are locked against possible separation when interconnected for normal use whenever one member is applied to the other.

A further important object of the invention is to provide a ball and socket trailer coupling embodying an upwardly open spherical recess in the socket member adapted to be lowered over an upwardly projecting sphere of the ball member, and wherein the lowering of the socket member automatically locks the two members together.

Still another important object of the present invention is to provide an improved ball and socket coupling wherein the ball is normally held within the socket by means of a latch carried by the socket member, and in which the latch is positively moved into ball retaining position during interconnection of the coupling members, but may be conveniently released whenever disconnection of the coupling is desired.

An additional important object of this invention is to provide an improved trailer coupling comprising few simple but sturdy parts adapted to be readily constructed and assembled to produce a safe and efficient coupling unit.

These and other more specific objects and advantages of the invention will be apparent from the following detailed description from which it should be apparent that the gist of the invention is the provision of a ball and socket type of trailer coupling embodying a movable latch for locking the coupling members together and wherein automatically functioning means are provided for moving the latch into locking position whenever the coupling members are united.

A clear conception of the features constituting the present improvements, and of the construction and operation of a typical ball and socket trailer coupling embodying the invention, may be had by referring to the drawing accompanying and forming a part of this specification wherein like reference characters designate the same or similar parts in the various views.

Fig. 1 is a central vertical longitudinal section through one of the improved couplings, taken along the line 1—1 of Fig. 3, showing the ball member in elevation and the socket member secured to a trailer draft tongue and in the act of being applied to the upright ball member;

Fig. 2 is a similar central vertical longitudinal section through the same ball and socket coupling but showing the coupling members finally interconnected and locked against separation, the ball attachment and the trailer tongue having been omitted;

Fig. 3 is a bottom view of the socket member alone of the improved coupling;

Fig. 4 is a transverse vertical section through the latch releasing element of the coupling, taken approximately along the line 4—4 of Fig. 2, but showing a slight modification of the wedge and handle attachment; and Fig. 5 is a part sectional perspective view of the locking latch and actuating spring lever of the improved self locking coupling.

While the invention has been illustrated and described herein as having been embodied in a ball and socket type of trailer coupling formed primarily of sheet metal and especially adapted for application to automobile bumpers or frames and trailer draft tongues, it is not intended to restrict the use of the improved features to such couplings; and it is also contemplated that specific descriptive terms be given the broadest possible interpretation.

Referring to the drawing, the improved trailer coupling shown therein by way of illustration, comprises in general, a ball member 7 having a sphere 8 rigidly attached to a screw threaded mounting shank 9; an inverted U-shaped socket member 10 having a downwardly open spherical zone recess 11 at one end and an elongated inverted U-shaped opposite mounting end portion 12 attachable to a trailer tongue 13; a ball locking latch 14 swingably suspended from a transverse pivot 15 secured to the member 10 and having a transverse slot 16 therein; a U-shaped resilient lever 17 having one end provided with axially alined loops 18 embracing the pivot 15 and its opposite free end 19 swingable within the socket recess 11 while its medial portion coacts with the latch slot 16; an a latch releasing wedge 20 slidably engaging a fixed sheet metal guide 21 secured within the socket member 10 by a rivet 22, and having parallel spaced rods 23 projecting upwardly therefrom and adjustably attached to a manipulating handle 24.

The ball member 7 is provided with a base 26 at the bottom of the sphere 8 and with a clamping washer and nut assembly 27 coacting with the threated shank 9 whereby the member 7 may be firmly clamped to a draft vehicle, such as the bumper or frame of an automobile; and both the sphere 8 and the base 26 may be formed of sheet metal with the aid of punches and dies. The inverted U-shaped socket member 10 may be likewise formed of sheet metal and is reenforced along its lower edge around the open recess 11 by an integral flange 28, while its upper portion above this recess is provided with a U-shaped groove 29 formed to receive the similarly shaped end 19 of the spring lever 17 when the ball member sphere 8 is confined within the recess 11, as in Fig. 2. The rear end portion 12 of the socket member 10 may be firmly attached to the trailer tongue 13 by means of bolts 30 as in Fig. 1, or otherwise in a well known manner.

The ball latch 14 which is movably suspended from the fixed pivot 15, may also be formed of sheet metal, and has its lower portion provided with a spherical zone surface 32 which is adapted to snugly engage the adjacent lower portion of the ball member sphere 8 when the members 7, 10 are interconnected. The upper portion of the latch 14 has a rearwardly extending integral flange 33 formed thereon, and the latch is also provided with integral opposite side walls 34 depending from the flange 33 as shown in Figs. 1, 2, 3 and 5. The latch releasing and holding wedge 20 spans the interior of the inverted U-shaped socket member 10 and has relatively inclined front and rear surfaces, the former of which is adapted to coact with the rear edges of the latch walls 34 while the latter is slidably cooperable with the fixed reaction guide 21. This guide 21 is likewise formed of sheet metal and has opposite parallel side flanges adjoining the side walls of the coupling member 10 and with which the rear wedge surface coacts.

The central upper portion of the wedge 20 has a depression 36 therein, and the pivot 15 is surrounded by two coil type torsion springs 37 corresponding upper ends of which coact with the rear edge of the latch flange 33, while the opposite lower ends thereof bear against the wedge depression 36, as shown in Figs. 1, 2 and 3. These springs 37 serve to swing the latch 14 away from the spherical recess 11 of the socket member 10 whenever the wedge 20 is elevated as in Fig. 1, and also aid in moving the wedge 20 downwardly and the latch 14 into locking position when the socket member 10 is being applied to a ball member 7 as in Figs. 1 and 2. The parallel rods 23 are rigidly connected to the wedge 20 on opposite sides of the depression 36 and have upper screw threaded ends to which the wedge lifting handle 24 may be adjustably secured, either as shown in Figs. 1 and 2 or as depicted in Fig. 4.

The handle 24 is also formed of sheet metal and has inwardly directed lower ends 38 which in the embodiment of Figs. 1 and 2 are clamped to the threaded rod ends by and between upper and lower nuts 39, 40 respectively, of which the position of the lower nuts 40 determines the location of the wedge 20 when in lowermost position. In the modified handle attachment and wedge adjusting assemblage of Fig. 4, the upper nuts 39' are permanently but rotatably secured to the handle ends 38, while the lower handle positioning nuts 40 are adjustable along the screw threads of the rods 23 in order to provide a locating stop for the wedge 20 without disturbing the position of the handle 24 relative to the extreme upper rod ends. In both cases the handle 24 is of like formation and provides a gripping loop for effecting the lifting of the wedge 20.

When the various parts of the improved self locking trailer coupling have been properly constructed and assembled as hereinabove described, and the ball member 7 has been firmly attached to a hauling vehicle while the socket member 10 has been likewise attached to a trailer draft tongue 13, the operation of the device is as follows. Assuming the members 7, 10 to be separated, in order to connect the same it is only necessary to position the downwardly open recess 11 of the socket member 10 over the sphere 8 of the member 7 while the wedge 20 is elevated as in Fig. 1, and to thereafter lower the recessed end of the member 10, by gravity or otherwise. The sphere 8 will then contact the free end 19 of the latch actuating lever 17 and will swing this lever upwardly about the pivot 15 toward the groove 29 in the member 10, thereby causing the medial portion of the lever 17 which coacts with the slot 16 to swing the lower surface 32 of the latch 14 forwardly about the pivot 15 and beneath the lower rear portion of the entering sphere 8, as in Fig. 2.

This forward swing of the latch 14 about the pivot 15 also causes the latch flange 33 to bear against the upper ends of the torsion springs 37 and the lower ends of these springs to bear against the wedge depression 36, thereby automatically lowering the wedge 20 into latch locking position, as shown in Fig. 2. Continued lowering of the socket member recess 11 will cause the ball member sphere 8 to elevate the spring lever 17 into the groove 29 where it will not interfere with proper coaction of the sphere 8 with the spherical zone surfaces of the recess 11 and latch 14, and when the members 7, 10 have been finally interconnected the wedge 20 will coact with the guide 21 and with the rear edges of the latch side walls 34 to positively lock the latch 14 in ball confining position.

In order to disconnect the improved coupling, it is only necessary to pull upwardly on the handle 24 so as to elevate the wedge 20 into the position shown in Fig. 1, whereupon the torsion springs 37 will function to exert a rearward pressure against the latch 14 tending to release the latch surface 32 from the sphere 8. As the upward pull on the handle 24 continues, and the recess 11 of the socket member 10 is lifted away from the ball member 7, the latch 14 will swing about the pivot 15 away from the sphere 8 and will enable the socket member 10 to be freely removed by restoring the parts to the position shown in Fig. 1. The handle 24 may thereafter be permitted to remain in elevated position, or it may be lowered until a subsequent connection of the coupling members 7, 10 is desired.

From the foregoing detailed description of the construction and operation of the ball and socket coupling specifically illustrated, it will be apparent that the present invention in fact provides a self locking trailer attachment wherein the coupling members are automatically and positively locked against accidental separation whenever these members are being interconnected, while the members are also conveniently separable whenever desired. The improved coupling is simple but durable in construction and foolproof in use, and by forming various parts of the assemblage of sturdy sheet metal with the aid of punches and dies a compact unit capable of being manufactured at moderate cost results. The resilient lever 17 cooperates with the torsion springs 37 to eliminate undesirable looseness between the ball and the socket and latch, while still permitting free universal movement of these parts, and the final interlock between the sphere 8 and spherical recess 11 is effected primarily by the downward movement of the socket member 10 by gravity and does not require any manipulation of the handle 24 which is usable only in order to effect uncoupling. The invention has proven highly satisfactory and successful in actual use, and the improved couplings may be manufactured in various sizes for diverse uses.

It should be understood that it is not desired to limit

We claim:

1. A trailer coupling comprising, a ball member attachable to a hauling vehicle, a socket member attachable to a trailing vehicle and having a downwardly open socket cooperable with said ball member to provide a universal draft connection, a transverse pivot carried by said socket member rearwardly of said socket, a latch suspended from said pivot and being swingable toward said socket to retain said ball member therein, a lever having one end fulcrumed upon said pivot and its opposite end swingable within said socket while its medial portion coacts wtih said latch, said swingable lever end being engageable with the top of said ball member when entering said socket to automatically swing said latch toward said socket, a torsion spring embracing said pivot and having one end projecting rearwardly of and its other end coacting with said latch, and a manually retractable wedge extending upwardly through and being slidably mounted upon said socket member and coacting with said latch to positively lock the latter in ball retaining position, said spring being biased to constantly urge said wedge downwardly toward ball locking position and said wedge being retractable against said spring to cause the latter to release said latch from said ball member.

2. A trailer coupling comprising, a ball member attachable to a hauling vehicle, a socket member attachable to a trailing vehicle and having a downwardly open socket cooperable with said ball member to provide a universal draft connection, a transverse pivot carried by said socket member rearwardly of said socket, a latch suspended from said pivot and being swingable toward said socket to retain said ball member therein, a lever swingable about said pivot within said socket and being engageable with the top of said ball member when entering said socket to automatically swing said latch toward said socket, a torsion spring embracing said pivot and having one end projecting rearwardly of and its other end coacting with said latch, and a manually retractable wedge extending upwardly through and being slidably mounted upon said socket member and coacting with said latch to positively lock the latter in ball retaining position, said spring being biased to constantly urge said wedge downwardly toward ball locking position and said wedge being retractable against said spring to cause the latter to release said latch from said ball member.

3. A trailer coupling comprising, a ball member attachable to a hauling vehicle, a socket member attachable to a trailing vehicle and having a downwardly open socket cooperable with said ball member to provide a universal draft connection, a transverse pivot carried by said socket member rearwardly of said socket, a latch suspended from said pivot and being swingable toward said socket to retain said ball member therein, a lever swingable within said socket about said pivot and being engageable with the top of said ball member when entering said socket to automatically swing said latch toward said socket, a torsion spring embracing said pivot and having one end projecting rearwardly of and its other end coacting with said latch, a transverse upright guide secured to said socket member rearwardly of said pivot and a manually retractable wedge extending upwardly through said socket member and being slidably engageable with said guide and cooperable with said latch to positively lock the latter in ball retaining position, said spring being formed to constantly urge said wedge downwardly toward ball locking position and said wedge being retractable against said spring to release said latch from said ball member.

4. A trailer coupling comprising, a ball member attachable to a hauling vehicle, a socket member attachable to a trailing vehicle and having a downwardly open socket cooperable with said ball member to provide a universal draft connection, said socket being provided at its top with a U-shaped groove, a transverse pivot carried by said socket member rearwardly of said socket, a latch suspended from said pivot and being swingable toward said socket to retain said ball member therein, a U-shaped lever engageable with the top of said ball member when entering said socket and being swingable into said groove to automatically move said latch toward said socket, a torsion spring embracing said pivot and having one end projecting away from and its other end coacting with said latch, and a manually retractable wedge extending through and being slidably mounted upon said socket member and coacting with said latch to positively lock the latter in ball retaining position, said spring being formed to constantly urge said wedge downwardly toward ball locking position and said wedge being retractable against said spring to release said latch from said ball member.

5. A trailer coupling comprising, a ball member attachable to a hauling vehicle, a socket member attachable to a trailing vehicle and having a downwardly open socket cooperable with said ball member to provide a universal draft connection, a transverse pivot carried by said socket member rearwardly of said socket, a latch suspended from said pivot and being swingable toward said socket to retain said ball member therein, a lever having one end fulcrumed upon said pivot and its opposite end swingable within said socket while its medial portion coacts with said latch, said swingable lever end being engageable with the top of said ball member when entering said socket to automatically swing said latch toward said socket, a torsion spring embracing said pivot and having one end projecting rearwardly beyond and its other end coacting with said latch, and a manually retractable wedge having an opening therein and being slidably mounted upon said socket member and coacting with said latch to positively lock the latter in ball retaining position, said spring being biased and having its projecting end cooperable with said opening to constantly urge said wedge downwardly toward ball locking position and said wedge being retractable against said spring to release said latch from said ball member.

6. A trailer coupling comprising, a ball member attachable to a hauling vehicle, an inverted channel shaped socket member attachable to a trailing vehicle and having a downwardly open socket at the forward end of its channel section cooperable with said ball member to provide a universal draft connection, a pivot carried by said socket member and spanning said channel section rearwardly of said socket, a latch having side walls swingably suspended from said pivot and being swingable toward said socket to retain said ball member therein, a lever having one end fulcrumed upon said pivot between said retainer side walls and its opposite end swingable within said socket while its medial portion passes through and coacts with said latch, said swingable lever end being engageable with the top of said ball member when entering said socket to automatically swing said latch toward said socket, a torsion spring embracing said pivot between said latch side walls and having one end projecting rearwardly of and its other end coacting with said latch between said walls, and a manually retractable wedge extending upwardly through and being slidably mounted upon said socket member and coacting with said latch side walls to positively lock the latter in ball member retaining position in opposition to said spring.

References Cited in the file of this patent

UNITED STATES PATENTS

| | | |
|---|---|---|
| 2,061,234 | Hoflich | Nov. 17, 1936 |
| 2,115,629 | Gurley | Apr. 26, 1938 |
| 2,744,767 | Kleiman | May 8, 1956 |